May 4, 1943.  J. M. CROM  2,318,294
METHOD OF AND APPARATUS FOR TRIMMING EXCAVATIONS
Filed July 3, 1940  2 Sheets-Sheet 1
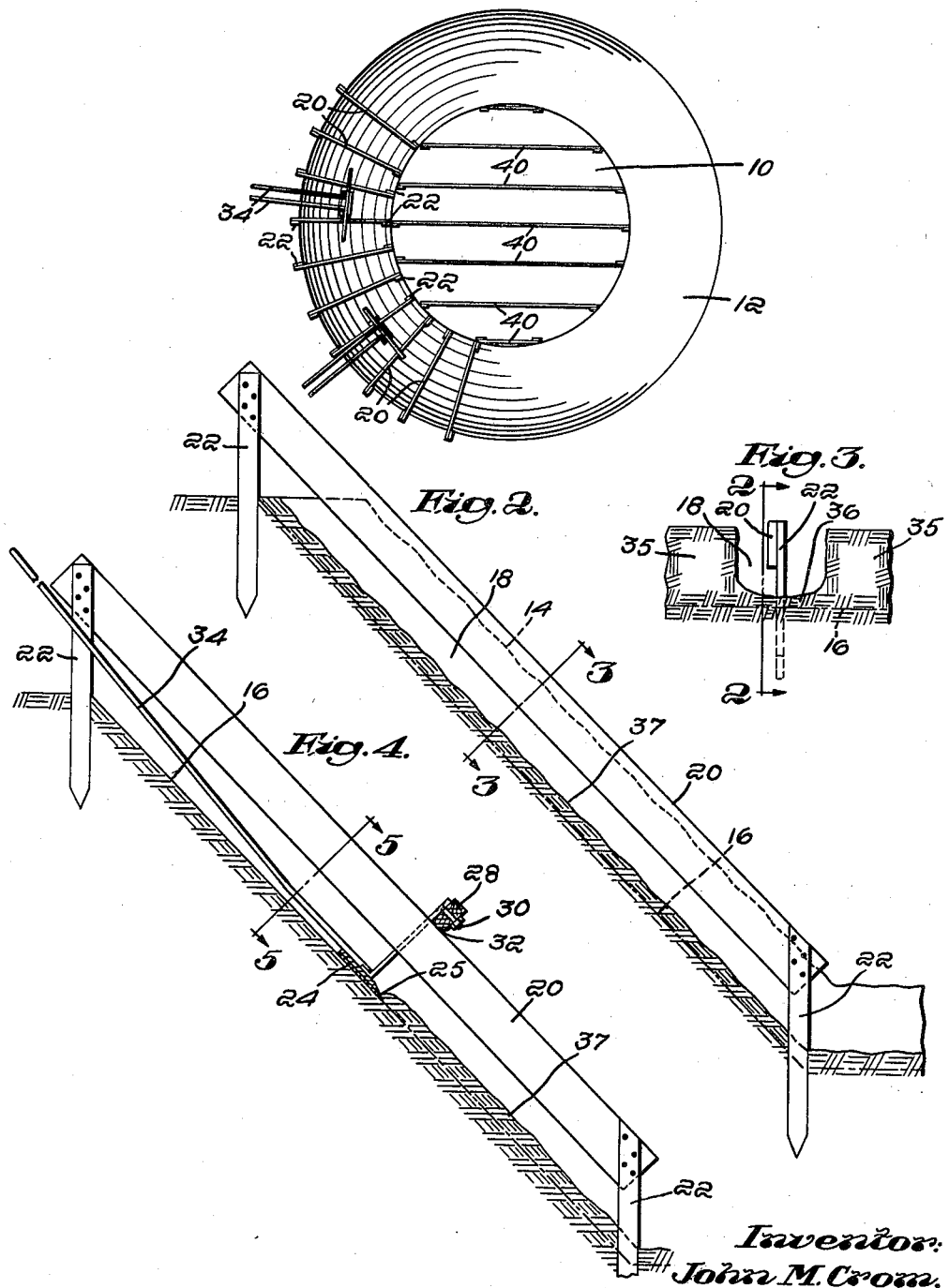
Inventor:
John M. Crom,
by
Kenway & Witter
Attorneys May 4, 1943. J. M. CROM 2,318,294
METHOD OF AND APPARATUS FOR TRIMMING EXCAVATIONS
Filed July 3, 1940 2 Sheets-Sheet 2

Inventor:
John M. Crom,
by Kenway & Witter
Attorneys

Patented May 4, 1943

2,318,294

UNITED STATES PATENT OFFICE 2,318,294

METHOD OF AND APPARATUS FOR TRIMMING EXCAVATIONS

John M. Crom, Jackson Heights, N. Y.

Application July 3, 1940, Serial No. 343,817

5 Claims. (Cl. 37—80)

This invention relates to a method of and apparatus for trimming excavations. In the formation of reservoirs, canal ditches and other earth excavating projects the top or rough excavating is usually done by machinery employing a drag line, power shovel or the like, and thereafter the finishing or trimming down to the desired grade is done by a more or less whittling operation, usually performed manually, in which the progress is slow and expensive. The primary object of my invention is the production of a method and apparatus for performing this trimming operation with facility and accuracy.

In the employment of my invention in the formation of reservoirs and ditches, for example, the rough excavating may be performed in the usual manner. Such excavating leaves sloping edge portions which must be trimmed down to the desired grade. My invention contemplates the mounting of rails or tracks extending in spaced relation transversely down and across these slopes and at a predetermined elevation above the desired grade, a trench preferably being provided for each rail to a depth approaching the desired grade. These rails serve as guides in the rough manual grading and then as guide supports for the trimming tool of my invention, all as hereinafter described.

My trimming tool comprises a body having a cutting or trimming edge and supported by bracket-like members hung from a bar of a length to rest on two adjacent rails and span the distance therebetween. The depending distance of the tool is such that the cutting edge is at the desired finish grade when the bar rests on the rails. The tool is preferably operated by hand and a plurality of handles are attached thereto for this purpose. In the usual and preferred form of the invention these handles extend rearwardly from the cutting edge and may be of a length to permit the operators to stand at the top of the slope and force the tool downwardly thereof to trim the excavations down to the desired grade. The relation of the tool and other parts of the apparatus, all as hereinafter specifically described, is such that the entire surface including the trenches is completed by the tool.

The cutting depth of the tool is wholly taken care of by contact of the bar with the rails, thus leaving the operators free to work the tool without giving any attention to the grade. The trimming is therefore easy, quick, and economical and produces a grade level meeting accurate requirements. The production of a method and apparatus embodying these novel features comprises a further object of the invention.

These and other features of the invention will be best understood and appreciated from the following description of preferred embodiments thereof selected for purposes of illustration and shown in the accompanying drawings in which:

Fig. 1 is a plan view of a reservoir excavating project employing my invention,

Fig. 2 is an enlarged elevation on line 2—2 of Fig. 3,

Fig. 3 is a sectional view taken on line 3—3 of Fig. 2,

Fig. 4 is a view like Fig. 2 but showing the trimming operation after the rough grade shown in Fig. 2 has been removed.

Figure 5:
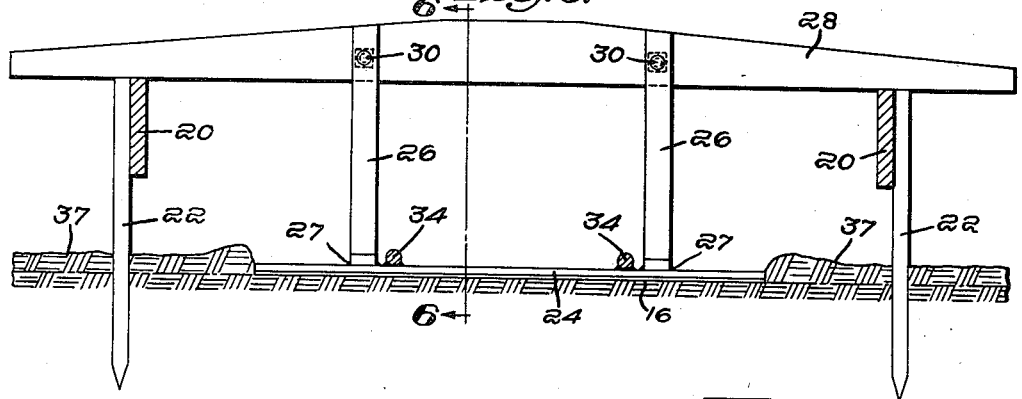
Fig. 5 is a sectional view taken on line 5—5 of Fig. 4.
Figure 6:
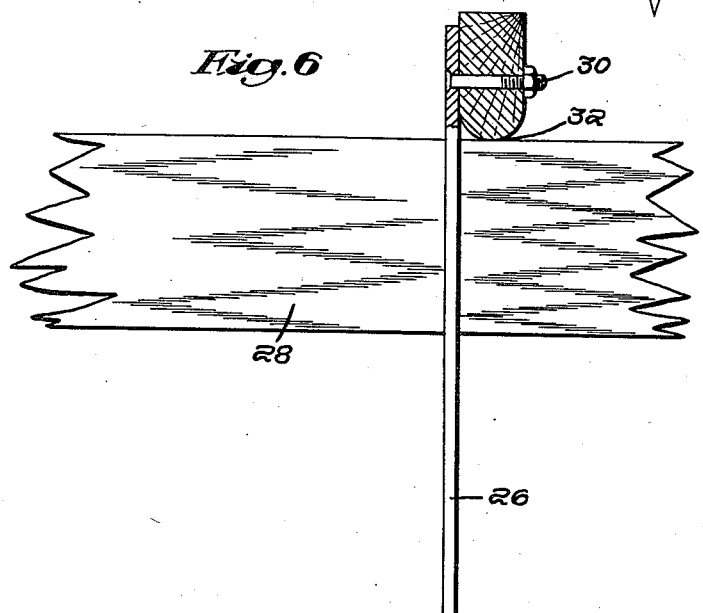
Fig. 6 is a fragmentary view taken on line 6—6 of Fig. 5 and showing the trimming tool in detail.

The reservoir excavation illustrated in Fig. 1 comprises a flat bottom portion 10 and an annular sloping edge portion 12. The rough excavating done to the level 14 has been performed, ordinarily by power-operated means, and the desired finish grade to which the excavation is to be trimmed is indicated at 16. In this rough grading the earth is ordinarily removed to a depth approximating about twelve inches above the final grade, which is the distance between the grades indicated at 14 and 16. My invention is employed in the trimming of the excavation down to the grade 16 substantially as follows.

I dig a plurality of radial and relatively spaced trenches 18 down the slope 12 to a depth of about ten inches which is about two inches above the desired finish grade 16. A screed board 20 is then mounted by stakes 22 within each trench and to a predetermined elevation above the desired finish grade. My trimming tool is adapted to be supported on the top edge of the boards 20 and this predetermined elevation from the top edge of the board or track 20 to the grade line 16 corresponds to the depending distance at which the trimming tool is located when supported on the boards, as will now be described.

My trimming tool comprises a body 24 having a cutting edge 25. The tool is supported by a pair of bracket-like members 26 welded to the body at 27 and connected at their top ends to a bar 28 by bolts 30. The cutting edge 25 extends outwardly at both ends beyond the brackets 26 and the bar 28 extends at both ends substantially beyond the cutting edge 25, all as illustrated in Fig. 5. The bar is adapted to rest on two of the boards or rails 20 which are spaced to receive the bar and the contacting edge 32 of the bar is preferably rounded whereby to permit the tool to have some rocking movement without its cutting edge penetrating below the grade line 16. The tool illustrated in the drawings is of the pusher type and is provided with operating handles or poles 34 fixed to the tool and extending rearwardly therefrom and from the cutting edge 25.

After the boards 20 have been placed as illustrated in Fig. 2 the earth 35 between the trenches 18 is removed manually down to a depth approximating the depth of the trenches, the workers using the boards 20 as an observation guide for this work. The trimming tool is then employed to finish the excavation to the line 16. Two or more operators grasp the poles 34 and, beginning at the top of the slope and with the bar 28 resting on the boards 20, force the tool downwardly whereby shaving the remaining earth 37 to the grade 16 as illustrated in Fig. 4.

The cutting width of the tool is comparatively short when cutting curved sections since the curvature of the slope 12 will not permit the use of a blade of extended length. I have employed a blade of about thirty inches in length on an excavation measuring one hundred or more feet in diameter. As illustrated in Fig. 5 the blade is substantially shorter than the distance between adjacent boards 20 and it projects beyond the brackets 26 at both ends. A trimming cut is first made down the center as illustrated in Figs. 1 and 5. Two other side cuts are then made, these two cuts respectively including the earth indicated at 36 in the bottoms of the two trenches. The position of the tool in a side cut is illustrated in Fig. 1 wherein one end of the cutting blade traverses a trench beneath its board 20. The cutter is ordinarily operated by three men and a strip six feet wide has been completely trimmed in five or six minutes, the resulting grade left being as flat and true as a floor.

The curvature of the bar at 32 permits the handles 34 to be raised and lowered, while maintaining the cutting point 25 at a uniform radius, and such movement facilitates the trimming operation in hard earth since raising of the handles points the blade downwardly. It is noted, however, that the supporting structure at 32 does not permit the blade to bite below the grade line 16.

While the invention is of particular value in trimming slopes 12 and the like, it can also be used to trim horizontal surfaces. For example, screed boards 40 can be placed at the bottom portion 10 of the excavation and this portion trimmed substantially in the manner already described. In some portions of such trimming, however, it may be desirable to use trimming tools of the drawing rather than of the pushing type and such drawing type of tool in which the handles extend forwardly of the cutting edges is within the scope of my invention.

Figure 7:
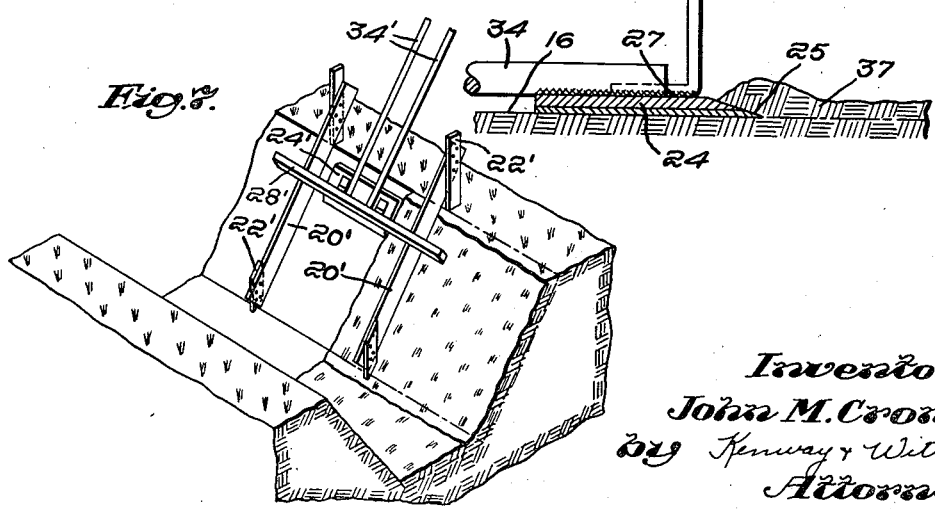
Fig. 7 is a fragmentary view of a ditch being trimmed in accordance with my invention.

It will be understood that ditches, as illustrated in Fig. 7 may also employ my invention to great advantage. In such case screed boards 20' are mounted as are the boards 20 and the tool is operated in the manner already described. The parts in Fig. 7 corresponding to the parts already described are indicated by like reference characters primed. It will also be understood that, while I have illustrated the track formed by the screed boards 20 and 20' as being straight, these boards may be constructed to form a track either concave or convex therealong whereby to finish curved surfaces.

Having thus described my invention what I claim as new and desire to secure by Letters Patent of the United States is:

1. An apparatus for trimming an excavation to a desired grade, comprising a pair of rails mounted in spaced and substantially parallel relation on the excavation and at a predetermined elevation above the desired grade, a bar, and a knife-like trimming tool suspended from an intermediate portion of the bar, the bar being of a length to rest on either rail when the combined tool and bar are moved as a unit to a position locating the knife at the other rail.

2. The apparatus defined in claim 1 in which each rail is suspended on relatively spaced posts and at an elevation spacing the rails from the earth therebeneath, and in which the knife projects at both ends a distance to extend beneath either rail while the bar is located in a position to rest on the other rail.

3. A manually operated earth trimming tool comprising a relatively long bar, an earth trimming knife, means supporting the knife on and a predetermined distance beneath and substantially parallel with the bar, the knife being shorter than the bar and located intermediately of its ends, and handle means for manipulating the tool carried by and extending laterally away from the knife.

4. The tool defined in claim 3 in which the knife comprises a substantially long and flat bottomed blade sharpened at its forward edge and to which blade the handle means is attached and extends a substantial distance rearwardly thereof, whereby adapting the knife to be pushed forwardly a substantial distance from the operator in earth trimming operations.

5. In a method of trimming a roughed-out excavation to the desired grade by means of an earth-trimming knife having portions adapted to overlie a pair of spaced-apart depth-limiting tracks both having their upper surfaces located a predetermined distance above the desired grade and said knife having an end portion adapted to be moved under a track, said method comprising digging two parallel spaced-apart trenches in the excavation to a depth approaching the desired grade, mounting said tracks within said trenches in vertically-spaced relation to the bottoms of the trenches so as to provide an unobstructed clearance therebetween throughout substantially the full length of the tracks, and moving the trimming knife along paths generally parallel to each other and to the tracks so as to trim the earth in the area between and beneath the tracks until the overlying portions on the trimming knife engage the upper surfaces of the tracks.

JOHN M. CROM.